United States Patent [19]

Doerr et al.

[11] Patent Number: 4,817,786
[45] Date of Patent: Apr. 4, 1989

[54] DRIVE ARRANGEMENT FOR TRAMMING CONVEYOR

[75] Inventors: Richard E. Doerr; Thomas W. McCormick, both of Morgantown, W. Va.

[73] Assignee: Consolidation Coal Company, Pittsburgh, Pa.

[21] Appl. No.: 853,318

[22] Filed: Apr. 18, 1986

[51] Int. Cl.⁴ .................. B65G 23/04; F16H 3/44
[52] U.S. Cl. .................................. 198/834; 198/835; 74/785; 74/801
[58] Field of Search ............... 198/834, 835; 74/785, 74/801, 797, 805

[56] References Cited

U.S. PATENT DOCUMENTS

| | | | |
|---|---|---|---|
| 2,053,055 | 9/1936 | Wadd | 74/785 X |
| 3,005,357 | 10/1961 | Christian | 198/835 X |
| 3,268,066 | 8/1966 | Kishimoto | 198/835 X |
| 4,014,224 | 3/1977 | Pitts | 74/805 |
| 4,359,914 | 11/1982 | Meisel, Jr. | 74/785 X |
| 4,391,163 | 7/1983 | Benthake et al. | 74/797 X |
| 4,685,354 | 8/1987 | McCabria | 74/785 |

Primary Examiner—Thomas F. Callaghan
Assistant Examiner—Peter M. Cuomo
Attorney, Agent, or Firm—Alan N. McCartney

[57] ABSTRACT

A sprocket drive system for a chain conveyor comprises a motor driven transmission which is coupled to a planetary gear unit for speed reduction. The output sprocket is located near the center between the motor and the planetary gear unit. To make the combination more compact in size and efficiency, the drive from the motor is transmitted by means of a shaft coaxially through the drive shaft of the planetary gear unit and through the drive shaft of the transmission unit. The coaxial shaft is then coupled to the transmission unit input shaft. The transmission output shaft is coupled to the planetary gear box and then to the drive sprocket.

1 Claim, 1 Drawing Sheet

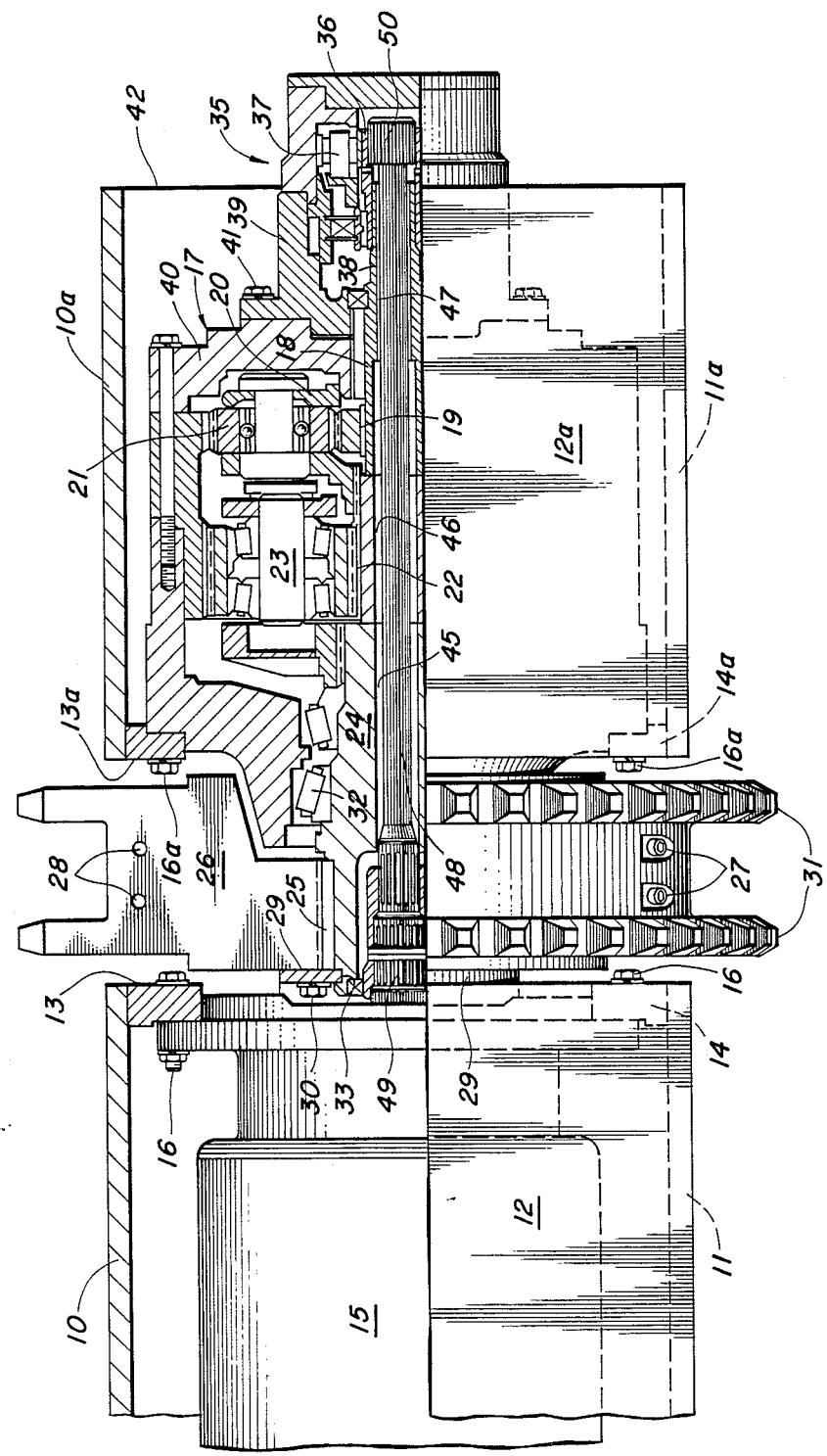

DRIVE ARRANGEMENT FOR TRAMMING CONVEYOR

BRIEF DESCRIPTION OF THE PRIOR ART

The closest prior art to the concept taught in this invention is U.S. Pat. No. 4,014,224 issued to Dallas L. Pitts. In this patent an electric motor is coupled through a coaxial opening in the drive sprocket to the planetary gear input shaft. The drive shaft then continues through the planetary gear assembly and is subsequently coupled to an electric brake on the opposite side of the planetary gear assembly. It does not disclose a coaxial opening through the planetary gear assembly nor does the patent disclose a coaxial opening through the electric brake.

BRIEF DESCRIPTION OF THE INVENTION

This invention discloses a compact, easily maintained drive system for a drive sprocket used in a chain conveyor. The invention essentially comprises a transmission which is coupled to a system of planetary gears for speed reduction. The output sprocket is located near the center between the motor and the planetary gears. In order to make the combination more compact in size and efficiency and more easily maintained so that the motor and the transmission are both readily accessable in case of failure, the drive from the motor is transmitted by a coaxial shaft through the shaft of the sprocket assembly, the planetary gear unit and the transmission unit. The coaxial shaft is then coupled to the transmission unit input shaft. In the one mode of operation, the motor is coupled from the transmission unit input to the transmission unit output. In a second mode, the input of the transmission is coupled through planetary gears in the transmission unit reducing the output RPM of the transmission unit output shaft.

The assembly disclosed herein provides a center located drive sprocket with a motor mounted on one side and the planetary gear reduction unit and the transmission unit mounted on the other side. The arrangement herein provides not only an efficient and compact power drive unit, but it also provides ease of maintenance since the motor and transmission are most likely to fail during use, both of which are located on the outside of the drive unit and therefore can be easily removed and replaced during the normal use of the conveyor without total disassembly of the conveyor drive unit.

BRIEF DESCRIPTION OF THE FIGURE

The FIGURE illustrates a partial cross-sectional view of the drive unit of this invention illustrating the motor, the planetary gear unit and transmission unit as assembled.

DETAIL DESCRIPTION OF THE INVENTION

Referring to the FIGURE, the conveyor basically comprises an upper deck 10, a lower deck 11 and side walls 12 which essentially form a box. Upper and lower decks 10 and 11 are attached to an end plate having an upper portion 13 and a lower portion 14, respectively. A second set of deck plates 10a and 11a are likewise connected to an end plate having an upper portion 13a and a lower portion 14a, respectively. Side walls 12a are connected between upper deck 10a and lower deck 11a to form a box. A motor 15 is attached to end plate portions 13 and 14 by means of a plurality of bolts 16. A planetary gear unit referred to generally by arrow 17, is attached to end plate portions 14 and 14a by means of a plurality of bolts 16a.

Planetary gear unit or assembly 17 is a standard two stage planetary gear reduction assembly and essentially comprises an input shaft 18 which is connected through a coupling 19 to an input carrier 20. Input carrier 20 contains a plurality of planetary gears 21. Input carrier 20 is coupled to sun gear 22 which in turn is coupled to an output carrier assembly 23. Carrier assembly 23 is, in turn, coupled to a shaft 24 which comprises the output shaft for planetary assembly 17. Shaft 24 is provided with splines 25 which provide a rigid mechanical coupling to a hub 34 configured to retain a split sprocket assembly 26. Sprocket assembly 26 for ease of installation is a split sprocket assembly, the two halves being coupled by means of bolts 27 into threaded holes illustrated by number 28. A key 34a prevents split sprocket assembly 26 from slipping around hub 34 when driving a chain (not shown). Hub 34 is retained on output shaft 24 by means of a "C" shaped retainer 29 which is attached to hub 34 by means of a plurality of bolts 30. Each half of sprocket assembly 26 fits over hub 34 and is provided with a plurality of teeth 31 for engaging the conveyor chain and moving the conveyor chain in the direction desired. Bearings 32 are provided throughout the unit where needed.

A transmission unit, generally referred to by arrow 35, provides for two output speeds. One speed is directly coupled from the motor shaft to the planetary gear input, while the second speed is reduced by a planetary gear assembly inside transmission unit 35 itself.

The planetary gear assembly in transmission unit 35 has the usual construction with an input 36 coupled through a planetary carrier assembly 37 to an output shaft 38 of transmission unit 35. Output shaft 38 may be made of unitary part of input shaft 18 of planetary assembly 17, if so desired. Otherwise, the shaft can be coupled in any usual manner such as splines or keyed to input shaft 18. Transmission unit 35 is coupled through its casing 39 to the casing 40 of planetary assembly 17 by means of a plurality of bolts 41.

An axial opening 45 is provided through the output shaft 24 of planetary assembly 17. A continuation of axial opening 45 is provided by an opening 46 through the input shaft of planetary assembly 17. A further axial opening 47 is provided through output shaft 38 of transmission 35. Passing through axial openings 45, 46 and 47 is a shaft 48 which is coupled to the output 49 of motor 15. Output shaft 48 is coupled through splines 50 to input shaft 36 of transmission 35.

Motor 15 is an electric motor and may be a DC or AC motor. In the preferred embodiment, motor 15 is an AC motor. The wires etc. to the motor have not been illustrated.

OPERATION

The apparatus illustrated in the FIGURE is first assembled in the following manner:

Transmission unit 35 is normally first bolted to casing 40 of planetary gear assembly 17 by inserting bolts 41 through casing 29 of transmission 35 and secured to casing 40. Transmission unit 35 is then formed of an integral part of the transmission unit of planetary gear unit 17. In the process of the assembly of the two units, output shaft 38 must be coupled to input shaft 18 of planetary unit 17. If input shaft 18 and output shaft 38 are a single unit, then shaft 18 assembled by merely inserting splines which are illustrated as coupling unit 19 to input carrier 20 of planetary assembly 17. Hub 34 is then attached to output shaft 24 and "C" shaped retainer 29 is assembled into slot 33 and bolts 30 inserted and tightened into hub 34.

Planetary assembly 17 is then attached to end plate portion 13a and 14a by inserting bolt 16a and tightening the bolts until the assembly is securely connected to end plate portion 13a and 14a, respectively. Then split sprocket assembly 26 is coupled to hub 34 by inserting one-half of the sprocket assembly over hub 34 which may include a keyway 34a. The remaining half of split sprocket 26 is then assembled and secured as an unitary assembly by inserting bolts 27 and tightening them securely into holes 28.

The motor comprising output shaft 49 and shaft 48 are then assembled by inserting shaft 48 through openings 45, 46 and 47 with sprocket assembly 50 mating with input shaft sprocket portion 36. Motor 15 is then bolted securely by means of bolts 16 to end plate portion 13 and 13a.

In normal operation, transmission 35 will provide two speeds for sprocket assembly 26. One speed will provide a one to one rotational coupling between output shaft 48 of motor 15 and input of 18 of planetary gear assembly 17. The second setting of transmission of 35 will provide an additional reduction in speed between output shaft 48 and input shaft 18 of planetary gear assembly 17. As motor 15 is energized shaft 49 will rotate, either clockwise or counterclockwise depending upon the electrical connections of motor 15. Shaft 49 will rotate shaft 48 in a similar direction transferring energy to input 36 of transmission 35. Power will then be coupled directly to output shaft 38 or through planetary arrangement 37 to shaft 38, depending upon the setting of transmission 35. The power will then be transferred through input shaft 18 of planetary gear assembly 17 through input carrier 20 and to sun gear 22 of the second stage of planetary gears assembly 17 through output carrier assembly 23 and to output shaft 24 of planetary gear assembly 17. Output shaft 24, being coupled directly to sprocket drive 26 will cause sprocket drive 26 to rotate either clockwise or counterclockwise depending upon the rotation of shaft 48.

CONCLUSIONS

With the arrangement illustrated in the FIGURE an extremely compact and efficient drive unit for a chain conveyor has been described. Motor 15 and transmission 35 are easily removable in case problems develop in these units. The planetary gear assembly which is a rugged unit will require less maintenance than either motor 15 or transmission unit 35. Sprocket unit 26, likewise, can be assembled or disassembled without having to totally disassemble the entire drive unit.

The assembly as configured in the drawing, also provides a compact power unit which can be nearly the same length as the width of the conveyor itself. Thus, only a portion of the drive assembly, for example, a portion of the transmission or a portion of the motor, will project pass edge 42 of conveyor top plate 10a, for example. The compactness of the unit will permit the conveyor to move into extremely narrow rooms and further will permit passage of personnel and equipment by the conveyor during its normal use.

It is obvious that changes and modifications can be used and still be well within the spirit and scope of this invention as described in the specification and appended claims.

What we claim is:

1. A compact drive apparatus for a chain conveyor comprising:
   (a) a planetary drive means having a casing attached to said conveyor with an input and an output on opposite sides of said planetary drive means;
   (b) a chain sprocket drive means axially coupled to the output of said planetary drive means;
   (c) motor means having a casing and an output shaft, said casing of said motor means attached to said conveyor and having said output shaft of said motor means facing said output of said planetary drive means;
   (d) a variable speed transmission means having an input and a coaxially mounted output, said variable speed transmission having its coaxially mounted output coupled to said input of said planetary drive means, and having a first opening through its output in communication with the input of said variable speed transmission means;
   (e) a second opening passing axially through said chain sprocket drive means and said planetary drive means output; and
   (f) means for mechanically coupling said output shaft of said motor means through said first and second openings to said input of said variable speed transmission means, whereby said apparatus provides a compact and easily maintained chain drive arrangement.

* * * * *